(12) United States Patent
Bojarski

(10) Patent No.: US 12,197,231 B2
(45) Date of Patent: Jan. 14, 2025

(54) ONE KIND OF MAN-MADE SKI RESORT TRANSPORTATION SYSTEM AND TRANSPORTATION METHOD

(71) Applicant: CLAYDON GROUP LIMITED, Hong Kong (CN)

(72) Inventor: Pierre-Nicolas-Jean Bojarski, Saint Nizier du Moucherotte (FR)

(73) Assignee: CLAYDON GROUP LIMITED, Hong Kong (CN)

( * ) Notice: Subject to any disclaimer, the term of this patent is extended or adjusted under 35 U.S.C. 154(b) by 738 days.

(21) Appl. No.: 17/413,397

(22) PCT Filed: Dec. 3, 2019

(86) PCT No.: PCT/CN2019/122664
§ 371 (c)(1),
(2) Date: Jun. 11, 2021

(87) PCT Pub. No.: WO2020/119520
PCT Pub. Date: Jun. 18, 2020

(65) Prior Publication Data
US 2022/0035380 A1    Feb. 3, 2022

(30) Foreign Application Priority Data
Dec. 12, 2018 (CN) .......................... 201811515976.7

(51) Int. Cl.
*G05D 1/00* (2024.01)
*G06Q 50/40* (2024.01)
*G08G 1/00* (2006.01)

(52) U.S. Cl.
CPC ........... *G05D 1/0297* (2013.01); *G06Q 50/40* (2024.01); *G08G 1/202* (2013.01)

(58) Field of Classification Search
CPC ....... G05D 1/0297; G06Q 50/30; G08G 1/202
(Continued)

(56) References Cited

U.S. PATENT DOCUMENTS 9,958,864 B2 * 5/2018 Kentley-Klay ...... G05D 1/0287
2015/0161554 A1   6/2015 Sweeney et al.
(Continued)

FOREIGN PATENT DOCUMENTS

CN   109598448 A   4/2019
CN   109685254 A   4/2019
(Continued)

OTHER PUBLICATIONS

Anonymous, "Bandvagn 206", Wikipedia, Nov. 18, 2018, pp. 1-6, Retrieved from the Internet: URL:https://en.wikipedia.org/w/index.php?title=Bandvagn_206&oldid=869359849 [retrieved on Apr. 8, 2022].
(Continued)

*Primary Examiner* — Marc Burgess
*Assistant Examiner* — Blaze A Belobrajdic
(74) *Attorney, Agent, or Firm* — Scully, Scott, Murphy & Presser, P.C.

(57) ABSTRACT

This disclosure relates to a man-made ski resort transportation system, including: the ski slope control center(s), being used to receive ski slope environmental data, judge if the environmental data of each ski slope in the man-made ski resort map is within the preset critical value, to define the zones of ski slope in which the ski slope environmental data are not within the preset critical value, and sending the defined ski slopes network digital map to vehicle dispatch control center(s); vehicle dispatch control center, is used to receive the man-made ski resort digital maps, transportation zones environmental parameters and transportation needs, according to the man-made ski resort digital map and the transportation zone's environmental data calculate transportation zone digital map and according to the transportation zone digital map, transportation zone environmental data
(Continued)

and transportation needs from users' terminals, work out routes and send them to each vehicle and users.

18 Claims, 14 Drawing Sheets

(58) Field of Classification Search
USPC .......................................................... 701/2
See application file for complete search history.

(56) References Cited

U.S. PATENT DOCUMENTS

2018/0211541 A1\* 7/2018 Rakah ................ G06Q 10/0631
2019/0018411 A1\* 1/2019 Herbach ............... B60W 40/08

FOREIGN PATENT DOCUMENTS

WO   WO-2018115764 A1 \*  6/2018   ........... A01D 34/006
WO   WO-2020065607 A1 \*  4/2020   ............... E01H 4/02

OTHER PUBLICATIONS

Extended European Search Report dated Apr. 20, 2022 received in European Patent Application No. EP 19895383.8.

\* cited by examiner

ONE KIND OF MAN-MADE SKI RESORT TRANSPORTATION SYSTEM AND TRANSPORTATION METHOD

FIELD OF INVENTION

This disclosure relates to the technical field of man-made ski resort, especially involving one kind of man-made ski resort transportation system and transportation method.

BACKGROUND OF THE INVENTION

In the following aerial lift includes: chairlift, gondola lift, cable car . . . .

In ski resort, the skiers always go up from bottom to the top of ski slope by taking some transportation tools and then ski down. At present, limited by fixed pick-up location of transportation tools, such as: aerial lift, surface lift and magic carpet, the skiers have to go to the fixed pick-up location themselves to ride up to the top of ski slope. Meanwhile, limitation of pick-up location of transportation tools also result that ski slopes in the ski resort are operated with fixed pick-up and fixed drop-off locations, i.e. the operation is carrying out only following pick-up and drop-off locations of transportation tools, this severely affects the ski resort design and operation. For example, when the weather (wind) on partial limited area of the ski resort is not good and results in the transportation tool (aerial lift) to stopped, then the whole ski resort may has to be closed. Also, when small part of ski slope is not suitable for ski or the snow on the slopes do not meet the requirements for skiing, the operator make decision to close/open large zone of the slope network to the skier. If because of the bad weather in partial zone of the slope and the transportation tool stops to operate, not only the zone of slope with bad weather being closed, but also all the linked ski slopes.

In addition, due to the limitations of pick-up location of transportation tools, the hotels near the pick-up location of the ski slope charge high price and those far from the pick-up locations of the ski slope charge low price.

At present, as shown in FIG. 1, ski slopes 2 are serviced mainly by lifts 3 and these lifts' loading and unloading locations are fixed in position, ski slopes 2 have fix bottom of ski lift 31 and fix top of ski lift 32. All lift system need concrete foundations for line towers, so any relocation in winter is nearly impossible and lifts are not ecologically friendly. Only very short lift (rope tow) can be moved within a few days.

The loading point, also known as pick-up location, means the area where skiers or goods or passengers can load in the transportation system. The unloading point, also known as drop-off location, means the area where skiers or goods or passengers on the transportation system can get off. Pick-up locations and drop-off locations can also meet various other needs of a ski resort in same way, as for: ski school lesson, the restaurant supply, carrying the snow or the snow making machine.

The loading/unloading locations of lifts are fixed, so the ski slopes are operating with fixed starting and fixed ending in locations. If any location along a slope is not skiable, the whole slope has to be closed. If the bottom or the top of a lift is not accessible by ski, the whole lift needs to be closed and all the slopes linked to this lift needs to be closed as well. The lack of skiable condition in one location disturbs the whole of the ski resort, even if the rest of the resort is skiable. As shown in FIG. 2, if the bottom of the ski resort does not have enough snow for skiing, thus skiers cannot come back to the ski resort by ski, then, the entire ski resort needs to close, i.e. the lack of snow in zone 4 result that area 5 is skiable, but unusable. This could be a case if global warming reduces the snow quantity at bottom of the ski slopes.

Because of national safety rules aerial lifts have limitation to operate at night. Today, night operation of altitude restaurant with no road access is limited to only good skier that can ski down at night. Today altitude hotel without road access, cannot be operated smoothly because of the access lift closed at night and client have difficulty in reaching or leaving the hotel surrounded by snow In a large ski slope network, the snow making machine systems need: water pipe, electricity power, air pressure, communication cable . . . along the ski slopes. This network is most of the time underground, fixed in position and custom made to water pressure and hourly capacity. So snow making machines water and electricity supply are only fixed in location along the ski slope networks.

In addition, the original design of aerial lift should include, from the beginning, the specification of the future hourly capacity even if this high hourly capacity is not needed during some period of time. This make the original investment more expensive and in addition it has to bet on the possible skier market increase, so during the early stage operation of a ski resort, the aerial lift is over invested and has low occupancy rate. Then the ski resort may not be able to pay back the investment during the first few years of operation.

Aerial lifts are fixed in position and are custom designed for a given mountain, and aerial lifts are costly to move to another location. Because of this, there is not any official secondhand market for aerial lift mortgage value, and it cannot be rent or lease leasing.

The aerial lift has a long delivery and installation time, lasting from half a year to 1 year.

Each aerial lift needs safety control inspection by government inside the ski resort. It's time consuming and has influence on the ski resort operation.

Hourly capacity of aerial lift is limited by loading/unloading arrangement, even most of loadings/unloading's are done on moving vehicles at low speed, and, there are difficulties and safety concerns for skiers.

The aerial lifts make the ski resort operation very sensitive to stoppage (as wind) or breakdown of the lifts. Sometimes if an aerial lift stops to operate, the ski slopes served by the lift have to be closed.

Aerial lifts are fixed in position and the top station should be located in a place servicing as many as possible ski slopes starting from this location which limit the possibility of design of the ski slope network and reduce the profitability.

In a ski slope network, it is common that most skiers change the area to ski to another area at the same time, for instance: following the sun and avoiding the cold shadow side, or changing to a location where in the afternoon the snow is better in quality . . . . Today each area needs to have a full-size lift (high hourly capacity) even if the lift has low occupancy rate at some time during a day. This is creating over investment and low occupancy rate of some lift and ski slopes.

When an aerial lift breakdowns or has a stoppage, the full lift stops. If an evacuation is necessary, it can take several hours to evacuate all passengers, and when skiing temperature drops below −10° C. it can be very dangerous for the passengers.

After a breakdown, the lift needs to be fixed during the night before the next morning opening, making pressure on employees to work in very hard environment and even becoming dangerous, especially during windy night when temperature drops below −20° C.

Most of lift technology are oblige to have the same vehicle to transport passenger. Only combi lift can accommodate chair/cabin at the same time. This does not allow to sale lift tickets according to 1st class and economy class, but only according to lifts usage.

Conventional snow making machines are fixed in location when making of snow and they make snow packs, then grooming machine is needed to spread snow evenly on ski slopes. When making snow at fixed location, snow near the machine is good in quality, but bad in far areas. This snow change in quality makes skiers annoyed and even increases the danger on the ski slope. Sometimes, the snow change in quality from icy crust to soft snow, even just from 60 m to 80 m in length, you will find, it is hard for skiers to accept.

BRIEF SUMMARY OF THE INVENTION

In view of the above-mentioned problems, putting forward this disclosure, so as to provide a man-made ski resort transportation system and method, to solve, or at least partly solve all the above-mentioned problems.

This disclosure is to have a better ski slope operation and management with higher occupancy rate and better safety and create a new mountain high capacity transit system allowing: mobile pick-up and drop-off locations for skiers, higher transport hourly capacity, longer transport distance, better snow quality. This disclosure create ski resort new business concept, new ski slope network design, different urbanism concept, faster construction, change the operating concept, and better operation efficiency at a cheaper investment cost.

This disclosure, in one aspect, provides one kind of man-made ski resort transportation system, including:

Ski slope control centers, to receive environmental parameters of each ski slope, judging if the environmental parameters of each ski slope in the man-made ski resort maps are within the preset critical value, to define the route in which the environmental parameters of each ski slope are not within the preset critical values, and sending the defined man-made ski resort digital maps to vehicle dispatch control centers;

The vehicle dispatch control centers are used to receive the man-made ski resort digital maps and transportation zone environmental parameters and transportation needs, according to the man-made ski resort digital map and transportation zone environmental parameters to calculate transportation zone digital map, and according to transportation zone digital maps, transportation zone environmental parameters and transportation needs from user's terminals to calculate the route and send the route information to vehicles and users.

There are many vehicles, each vehicle is connected with vehicle dispatch control center, each vehicle is used to receive the executive order sent by vehicle dispatch control center, and the vehicle moves according to the executive order.

Further, the transportation zones environmental parameters include: snow thickness in the transportation zones, air condition, ground slipperiness in the transportation zones, snow density in the transportation zones, weather conditions of transportation zone, if there are obstacles on the route.

Further, each vehicle is used to send vehicle operation information to vehicle dispatch control center in real timely. The vehicle operation condition include: vehicle location, vehicle speed, ground or aerial condition, fuel condition, battery condition, fault state of vehicle.

Further, the man-made ski resort digital map also includes: transportation zone route information and vehicle location information.

Further, each vehicle in the dispatchable vehicle system includes vehicle drive unit and vehicle cabin, and the vehicle cabin type is determined according to object to be transported.

Further, vehicle dispatch control center is also used to: receive the transportation needs from a ski slope dispatch control center, according to booking number at each accommodation and location to calculate the vehicles needed at each accommodation and location, and dispatch vehicles accordingly.

Further, the vehicle dispatch control center is also used to identify images of people and animals outside of groomed ski slopes, which are captured by cameras monitoring the transportation zones; when people or animal appear nearby the preset route, edit and send to vehicles the signal to slow down, stop or reroute.

Further, the vehicle dispatch control center is also used to identify images captured by cameras monitoring the ski resort transportation zones, identify obstacles outside the groomed ski slopes and moving objects in the transportation zone, edit and send to vehicles the signal to slowdown, stop or reroute Further, the vehicles are also used to identify the transportation zone images collected by cameras or sensors installed on the vehicles, identify obstacles on transportation zones, edit and send to the vehicles dispatch control center the information.

Further, each vehicle in the dispatchable vehicle system is Alvis Bv206S caterpillar armored full terrain vehicle.

Further, the vehicle dispatch control center is also used to receive the transportation needs given by the ski slope dispatch control center and resolve the transportation need into information of transportation location and object to be transported, give the transportation order to the vehicles which are close to transportation location and suitable for the object to be transported according to information of transportation location and object to be transported.

Further, the transportation zones environmental parameters are sent through manual input or automatic sensors or external database.

This disclosure, in another aspect, provides one kind of management method based on above-mentioned man-made ski resort transportation system, is characterized in that, including:

Receive environmental parameters of each ski slope, judging if the environmental parameters of each ski slope in the man-made ski resort map are within the preset critical values; when the environmental parameters of each ski slope are not within the preset critical value, to define the missing sections of ski slopes and send the defined ski slope network digital map to vehicle dispatch control center;

Receive the man-made ski resort digital maps, transportation zone environmental parameters and transportation needs, according to the man-made ski resort digital maps and transportation zone environmental parameters, to calculate transportation zone digital map, and according to the transportation zone digital maps, transportation zone environmental parameters and transportation needs from users' terminals, to calculate route and send the route information to vehicles and users.

Each vehicle is connected with vehicle dispatch control center, receives the executive order sent by the vehicle dispatch control center, and moves according to the executive order.

Further, the transportation zones environmental parameters include: snow thickness on the transportation zone, ground or aerial condition, slipperiness of snow/ground on the transportation zones, weather conditions, obstacles and avalanche risk in the transportation zone.

Further, each vehicle in the dispatchable vehicle system includes vehicle drive unit and vehicle cabin, and the vehicle cabin type is determined according to object to be transported.

Further, the above-mentioned man-made ski resort transportation method also includes: using vehicles to receive transportation needs from the ski slope dispatch control center, according to booking number in persons to calculate vehicle needed at each accommodation, car park, restaurant, ski school and other locations calculate routes and dispatch vehicles accordingly to each need.

Further, the above-mentioned man-made ski resort transportation method also includes: using vehicle dispatch control center to identify images of people and animals outside groomed ski slopes, which are continuously collected by cameras or sensors monitoring in the ski resort transportation zones; when people or animal appear on the preset route, edit and send to vehicles the signal to slowdown, stop or reroute.

Further, the above-mentioned man-made ski resort transportation method also includes: using vehicle dispatch control center to identify the images collected by cameras or sensors monitoring the transportation zone, and identify obstacles or moving objects or avalanche, edit and send to vehicles the signal to slowdown, stop or reroute, and give safety warning and notify safety, rescue or concerned center.

Further, the above-mentioned man-made ski resort transportation method also includes: vehicle dispatch control center's using of AI (Artificial Intelligence) to learn, according previous experiences and data of the day, selecting best route and vehicle schedule.

Further, in the vehicle dispatch system, all vehicles are Alvis Bv206s caterpillar armored all-terrain vehicles.

Further, the above-mentioned man-made ski resort transportation method also includes: making use of vehicle dispatch control center to receive transportation needs sent from the ski slope dispatch control center, resolve the transportation needs into information of transportation route and object to be transported, give transportation orders to vehicles that are close to transportation location and suitable for the object to be transported according to the information of transportation route and object to be transported.

Further, the transportation zones environmental parameters are sent through manual input or automatic sensors or external data bases.

Further, the above-mentioned man-made ski resort transportation method also includes: each vehicle sending vehicle operation information to vehicle dispatch control center in real timely. The vehicle operation real-time information includes: vehicle location, vehicle speed, ground or aerial condition, fuel condition, battery condition, fault state of vehicle.

Further, the man-made ski resort mass transit transportation system and transportation method in this disclosure may have multiple: transportation zones environment parameters, environmental parameters of ski slope, man-made ski resort digital map, transportation zone digital map, vehicle dispatch control center, ski slope dispatch control centers, and may be spread in various locations including inside vehicles.

Compared with the existing technology, the man-made ski resort transportation system and transportation method provided by this disclosure has following improvements:

(1) this disclosure, according to man-made ski resort digital map, works out the non-skiable zone of ski slopes, determines the new loading/unloading locations and sends them to vehicle dispatch control center. Vehicle dispatch control center, in real-timely, sends the new loading/unloading locations to each vehicle within the dispatchable vehicle system, to ensure that the transportation continue to operate in the way that the vehicles transport the waiting passengers from pick-up location to drop-off location, avoiding for the skiers the not skiable zones.

(2) this disclosure, according to booking number in persons at each: accommodation, car park and restaurant, ski school, calculates vehicle numbers and schedule needed and sends the vehicle needed at each: accommodation, car park, restaurant and ski school through the vehicle dispatch control center, so as to reasonably arrange vehicles in the dispatchable vehicle system and realize the high usage of dispatchable vehicle system.

(3) This disclosure, with the assistance of images analysis, sensors and GPS, or skier's mobile terminals, calculates the behavior and location of skiers outside of ski slopes, and improves safety of the ski resort by advising skiers or concerned services (as safety, rescue, search . . . ).

The above specification is only the technical summarization of this disclosure, in order to understand more clearly the technical method of this disclosure, it can be implemented according to the specification contents, and in order to make the above and other purposes, characteristics and advantages of this disclosure clearer and easy understanding, below shows the specific implementation of this disclosure.

BRIEF DESCRIPTION OF THE DRAWINGS

By reading the detailed description of optimized implementation in the ensuing chapters, all kinds of other advantages and benefits become clearer to the common technicians in this field. The attached figures are only used to show optimized implementation as its purpose and don't consider they are the limit to this disclosure. In the figures, the same reference symbols are used to show the same components. In the figures.

In the all attached figures.

1—is Village/Day-lodge, 2—the Ski slopes, 3—the Ski lift, 31—Fix bottom of ski lift, 32—Fix top of ski lift, 4—Missing snow zone, 5—Skiable but unusable area, 6—Non-skiable zone, 7—Skiable zone, 8—New pick-up location, 9—Pick-up location, 10—New drop-off location, A—Village, B—New pick-up location, C—New drop-off location, D—New pick-up location, E—New drop-off location, F—Mountain top, G—Village/Day-lodge, H—New pick-up location, I—New pick-up location, J—New drop-off location, K—New drop-off location, L—Mountain top, 11—Pick-up location, 12—Drop-off location, 13—vehicle route.

DETAILED DISCLOSURE OF THE INVENTION

Below reference shall be made to the attached figures in order to give more detailed description of this publicized illustrative implementing example. Although the publicized illustrative implementing example has been showed in the attached figures, but it should be understood that this disclosure can be realized in various ways and should not be limited by the samples described here. On the contrary, to provide these samples is to enable a more thorough understanding of the disclosure and to fully pass on the disclosure to the technicians in this field.

Technicians in this field might understand that, unless otherwise defined, all terms (including technical terms and scientific terms) used here have same meaning as the general understanding of common technician in the field of the disclosure. It should also be understood that terms such as those defined in a general dictionary should be understood to have meaning consistent with that in the context of an existing technology, and should not be explained in an idealized or overly formal implication unless specifically defined.

This disclosure is targeting at how to operate ski slope network when it is partly open or closed. Even if part of the ski slopes is non-skiable or part sections are closed, using the system and the method of this disclosure, the ski slopes' operation can be continued. Therefore, there need the system and the method of this disclosure to timely change or switch the starting and ending points of ski slopes. There are many reasons that may cause the starting and ending points of ski slopes change in location, e.g. snow quantity or quality, avalanche risk, wind, fog, skiers' safety, global warming in future, decisions made by operation staff and etc.

In this disclosure, "the man-made ski resort" means a snow play ground where the ski slope networks have more than 2000 m of cumulated length of water pipe to supply water to man-made snow making machines; and the ski slope network has an actual holding capacity of more than 500 skiers skiing at same time; and the cumulated length of ski slopes is over 3000 m and the lift-up capacity is over 1000 pph.

In this disclosure "transportation zones" means the areas, where vehicles can go up and down safely and the nearby areas.

Figure 1:
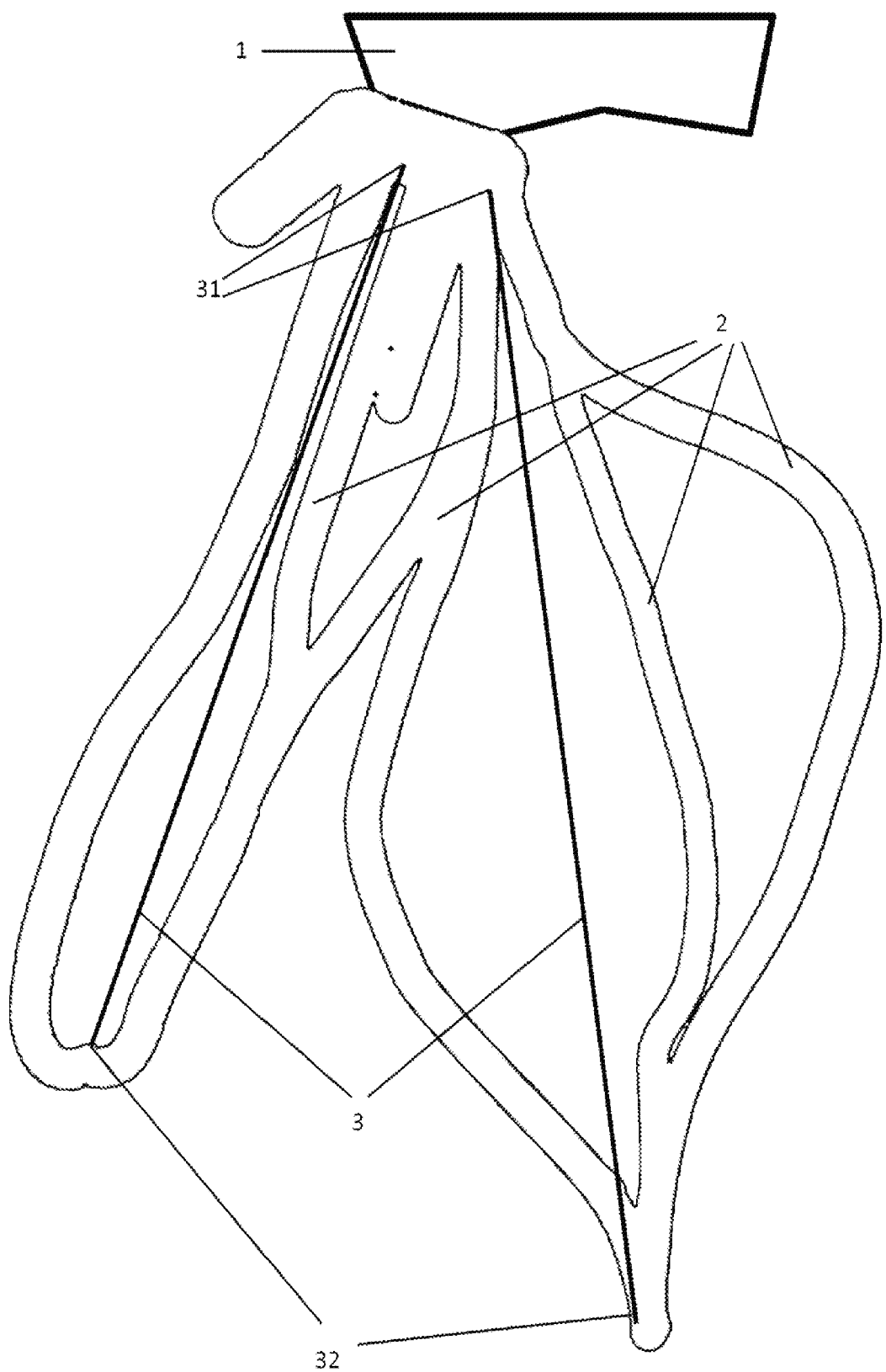
FIG. 1 is a current ski resort sketch.
Figure 2:
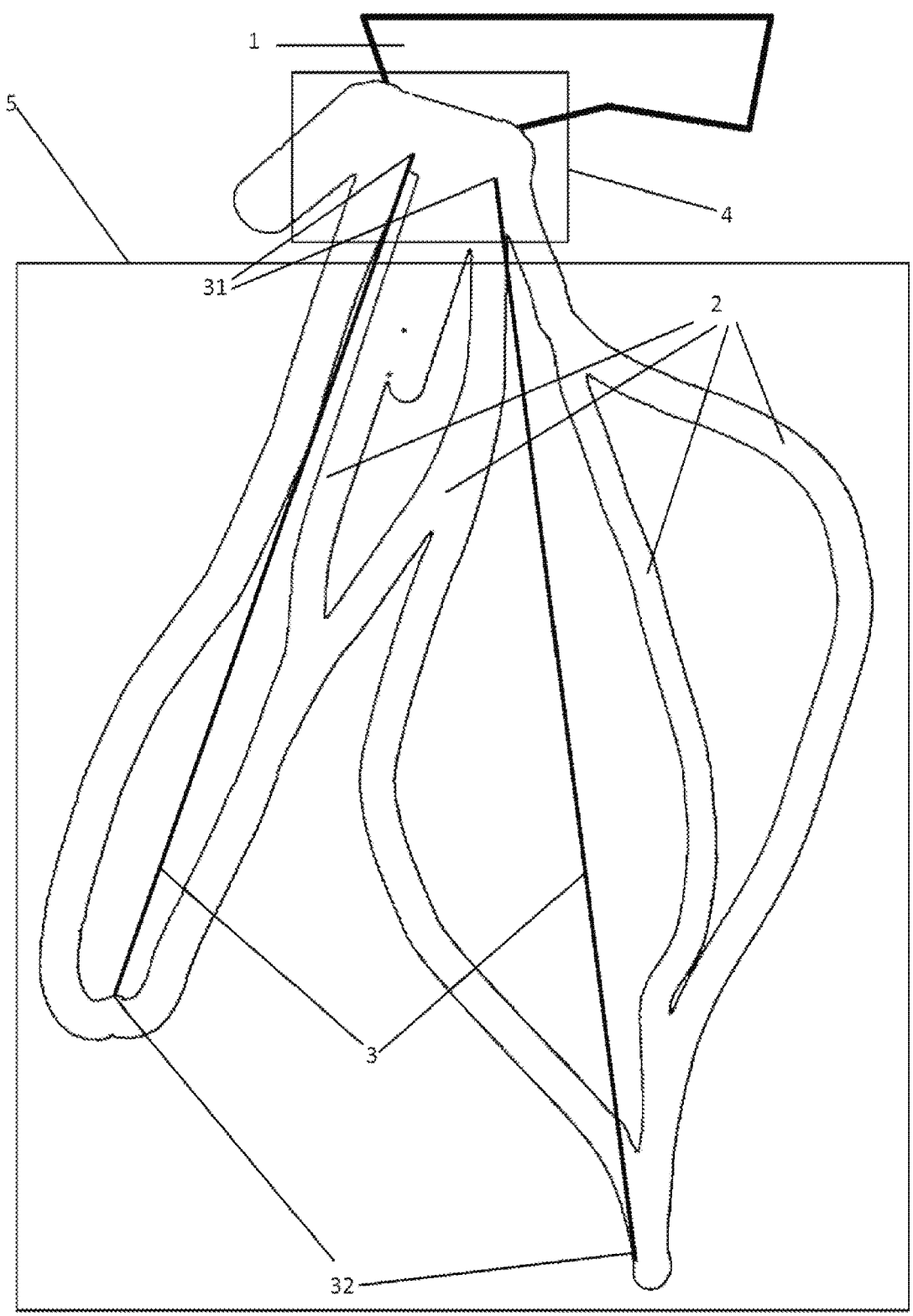
FIG. 2 is a sketch of common operation problem in current ski resort.
Figure 3A:
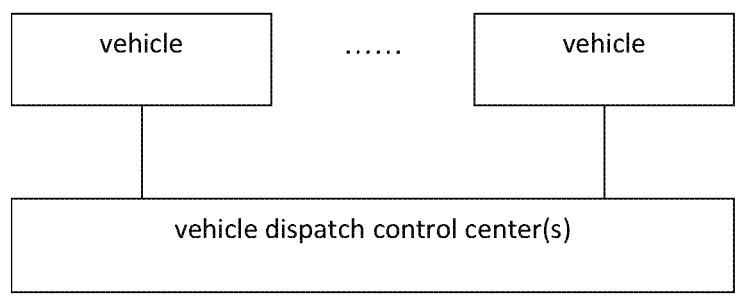
FIG. 3a is a block diagram of man-made ski resort transportation system in this disclosure.
Figure 3B:
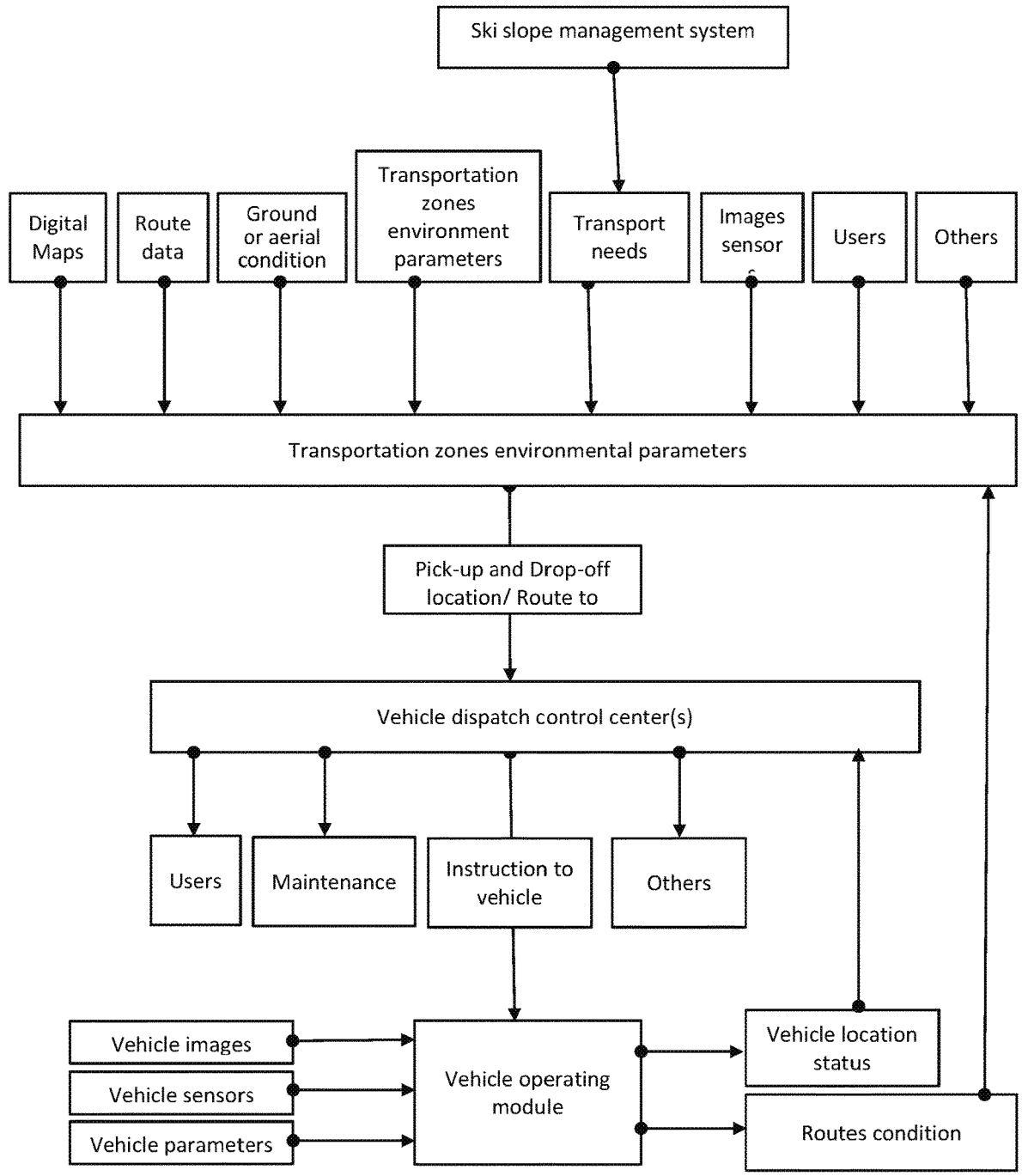
FIG. 3b is a schematic diagram of man-made ski resort transportation system in this disclosure.

As shown in FIGS. 3a and 3b, the man-made ski resort operation and management system offered in this disclosure includes:

The ski slope dispatch control center, being used to receive the environmental parameters of each ski slope, judge if the environmental parameters of each ski slope in the man-made ski resort map are within the preset critical values; to define the zones of ski slope in which the environmental parameters of each ski slope are not within the preset critical values, and send the defined ski slopes network digital map to vehicle dispatch control center.

The vehicle dispatch control center(s), being used to receive the man-made ski resort digital map, transportation zones environmental parameters and transportation needs; according to the man-made ski resort digital map and transportation zones environmental parameters, work out the transportation zone digital map, and according the transportation zone digital map, transportation zone environmental parameters and transportation needs from users' terminals, calculate the route and send the route to vehicles and users;

There are many vehicles, all vehicles are connected with vehicle dispatch control center; each vehicle is used to receive executive orders sent by the vehicle dispatch control center and moves according to the executive order.

The vehicle dispatch control centers in this disclosure communicate with many vehicles, according to man-made ski resort digital map, work out new loading/unloading locations and in real-timely send them to the vehicle dispatch control center, so as to through various vehicles transport objects waiting for transportation from pick-up location to drop-off location, ensure the skiable sections of ski slopes continue operating, avoiding for the skier the non-skiable zones.

The transportation zones environmental parameters include: thickness of snow accumulation, hardness of snow, density of snow, air and weather forecast of the ski resort area, obstacles or none on the transportation zones. Conditions on routes may vary according to the ski resort environment, as: snow/ground hardness on the road having a preset critical value less than 4000 Pa, accumulated snow density having a preset critical value as 0.3 g/cm3, and the weather condition preset critical values in route area: as less than 60 km/h in wind speed, farther than 200 m in visibility, more than 300 lux in lighting strength, higher than −30° C. in temperature and less than 40% in slope gradient on road.

Each vehicle includes vehicle drive unit and cabin, and the vehicle cabin type is determined according to objects to be transported. For example, daytime it is needed to carry skiers, the cabin is passenger cabin, when there is no need to carry the skiers during night, the cabin can be changed to carry goods or snow. Of course, the passenger cabin is not only limited to carry skiers, for instance in summer, the cabin can be used to carry tourists. The vehicle in the dispatchable vehicle system is Alvis Bv206S caterpillar armored full terrain vehicle, but not limited to this.

Vehicle dispatch control center is also used to receive data of transportation reservation from various locations, calculate vehicle needs in number and time at various location and pick-up locations; according to the vehicle number needed at various location, dispatch vehicles and send to vehicle dispatch control center.

This disclosure, according to reservation numbers in person in different hotels or accommodations, calculates the vehicle number and schedule needed at each hotel or accommodation exit and pick-up location, so as to reasonably arrange the vehicles and further to maximize the occupancy rate of each vehicle.

The vehicle dispatch control center is also used to identify images of skiers or obstacles on transportation zones, which are captured by cameras or sensors monitoring the ski resort transportation zones, when skiers or obstacles approaching the transportation route, edit and send to vehicles the signal of slowing down, landing, stopping or re-route.

The vehicles are also used to identify their route conditions, through vehicle sensors to collect information and control the vehicles' operation, when a vehicle's operation condition exceeds the preset critical values, (as sliding, wind . . . ) edit and send to the Vehicle dispatch control center the new route condition and wait for the Vehicle dispatch control center to give out new instructions.

The vehicles are also used to identify images of obstacles appeared on routes, which are captured by cameras or sensors mounted on vehicles, when new obstacles appear on routes, edit and send to the Vehicle dispatch control center the new route condition and wait for the Vehicle dispatch control center to give out new instructions.

The Vehicle dispatch control center is also used to receive transportation needs from user's mobile terminals and vehicles, then resolve the transportation needs into information of transportation location and object/s to be transported; according to the information of transportation location and objects to be transported, give out transportation orders to vehicles close to transportation location and suitable for the objects to be transported.

So, the vehicle dispatch control center and vehicles in this disclosure also can ensure skiers to take vehicles anywhere and anytime.

The environmental parameters of each ski slope are sent through manual input or sensor or external database.

Figure 4:
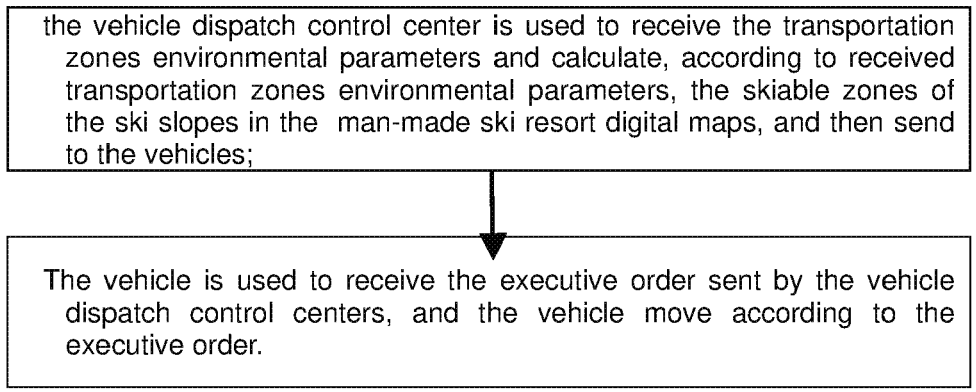
FIG. 4 is the step diagram of man-made ski resort transportation method in this disclosure.

As shown in FIG. 4, this disclosure provides a management method that can realize the above-mentioned man-made ski resort operation and management system, including following steps:

It is used to receive the environmental parameters of each ski slope, judge if the environmental parameters of each ski slope in the man-made ski resort map are within the preset critical values; when the environmental parameters of each ski slope are not within the preset critical values, to define the ski slopes, and send the defined man-made ski resort digital map to the vehicle dispatch control center;

It is used to receive the man-made ski resort digital map, transportation zones environmental parameters and transportation needs; according to the man-made ski resort digital map and transportation zone environmental parameters, to work out transportation zone digital map; and then according to the transportation zone digital map, transportation zones environmental parameters and transportation needs from user terminals, to calculate routes and send the routes to vehicles and users;

Each vehicle is connected with vehicle dispatch control center, to receive executive orders sent by the vehicle dispatch control center, and moves according to the executive order.

The vehicle dispatch control center(s) in this disclosure is connected with many vehicles, works out the man-made ski resort digital map and operable zone/s according to the transportation zones environmental parameters, and determines new loading/drop-off locations, according to the man-made ski resort digital map, then sends them to vehicles real-timely, so as to through various vehicles transport the waiting passengers from the pick-up locations to the drop-off locations, so as to ensure ski slopes, avoiding the non-skiable zone/s, can continue to operate.

The transportation zones environmental parameters include: snow thickness, snow hardness, snow density, air and weather conditions of ski resort area, obstacles on the transportation zones.

All vehicles include vehicle drive unit and cabin, and the vehicle cabin type is determined according to objects to be transported. The vehicle is Alvis Bv206S caterpillar armored full terrain vehicle or other full terrain vehicle.

The man-made ski resort transportation method above-mentioned also includes: using vehicle dispatch control center to receive reservation data in numbers at each hotel and location in the ski resort, to calculate vehicle needs in numbers at each accommodation building and pick-up locations according to the reservation numbers at different hotels and accommodation, and dispatch vehicles according to the needed vehicle numbers and schedule at various locations and send the information to the vehicle dispatch center.

Vehicle dispatch control center in this disclosure calculates vehicle needs at each accommodation building and pick-up locations according to the reservation numbers at each accommodation, so as to reasonably arrange vehicles and maximize the vehicle occupancy rate.

The man-made ski resort transportation method above-mentioned also includes: using the vehicle dispatch control center to identify images of skiers or obstacles on transportation zones, which are captured by cameras monitoring the ski resort transportation zones. When skiers or obstacles are approaching an operable route, edit and send to vehicles the signal of slowing down, stopping or re-route.

The vehicles are also used to identify their route conditions, through sensors mounted on vehicles to collect information and control the vehicles' operation, when the operation condition exceeds the preset critical values, (as sliding, wind), edit and send to the vehicle dispatch control center the new route condition and wait for the Vehicle dispatch control center to give out new instructions.

The man-made ski resort transportation method above-mentioned also includes: the vehicles are also used to identify images of obstacles on route, which are captured by cameras mounted on the vehicles, when new obstacle/s appear on routes, edit and send to the vehicle dispatch control center the new route condition and wait for the Vehicle dispatch control center to give out new instructions.

The man-made ski resort transportation method above-mentioned also includes: using the vehicle dispatch control center to receive transportation needs given by user's mobile terminals and vehicles, then resolve the vehicle transportation needs into information of transportation location and objects to be transported, then, according to the information of transportation location and objects to be transported, give the transportation order to vehicles close to the transportation location and suitable for the objects to be transported.

So, the vehicle dispatch control center and vehicles of this disclosure can also ensure that skiers can take a ride anywhere and anytime.

The transportation zones environmental parameters are sent through manual input, automatic sensor/s or external database.

This man-made ski resort digital map includes all ski slopes in the ski resort area, hotel, and locations in the ski resort area, and the vehicles real-time locations.

The transportation routes are predefined in the ski resort. A looped route allows the system better and smoother and more sustainable for a passenger transportation tool, as in if one route is not usable, vehicles can go through another route. Transportation routes are connected into a network running throughout or nearby the ski slope network and the resort village. The transportation route must connect with the tops of ski slopes, but the main purpose and key point is to have several connection points between vehicle routes and ski slopes as so to adapt to ski slopes variable in length.

The transportation route of each vehicle each time is determined by the loading and drop-off locations chosen by skiers.

Each drop-off location is linked to a vehicle route, as well as each pick-up location is linked to a vehicle route.

A transportation route is characterized by connection of group of pick-up points on the same route and the drop-off route, if these two routes are connected, then a transportation route is formed. If the two routes are not connected, the transportation system of this disclosure will look for a third transportation route that connects the pick-up route to the drop-off route.

When a new ride is requested, the transportation system of this disclosure starts by checking if some vehicle's routes already in service can have the new ride integrated into their routes. If none of the active vehicle matches, then a new vehicle is to be dispatched for the ride.

There are two types of pick-up locations:

Fixed pick-up location: this location is typically in gathering area where many skiers will go and take a ride to ski slopes. This pick-up location is linked to fixed drop-off route. Several of these fixed pick-up locations can be in the gathering area or at bottom of ski slope, to allow skiers to have a quick ride to each ski slopes without waiting for vehicles to arrive. The drop-off location may change according to the slope opening. Vehicles can go to this location even without demand. The vehicle flow can be adjusted according to loading time and the queue of vehicles. A permanent pick-up location is linked to a drop-off location or a group of pick-up locations. The transportation system in this disclosure can adjust vehicle requests to have a constant queue of vehicle. For example, there always have 3 vehicles waiting for departure at the fix pick-up location. The Algorithm for transportation at a fixed pick-up location is as follows: A maximum waiting time for skiers, for example 5 minutes, the vehicle should set off on time after the first skier entered the vehicle. If a vehicle is full, then it departs immediately.

On-demand pick-up location: this pick-up location is part of a pick-up route network and the drop-off route is chosen by skiers. Vehicles with different drop-off route may pick-up skier here according to the demand. These on-demand pick-up locations are typically in front of hotels, restaurants, or ski school. Vehicles normally do not stopping at these pick-up locations unless the system has received a demand instruction. The Algorithm for on-demand transportation is as follows: upon a demand for pick-up is received, the transportation system of this disclosure will try to match the ride with transportation on-going: the pick-up route and drop-off route should be the same transportation route, the vehicle should not be further than the pick-up locations along its route, and there should be enough space in the vehicle for the additional skier/s.

After unloading completed, the vehicle returns to its start point (fixed pick-up location, parking/garage)

The transportation system of this disclosure is limited to a predefined fixed routes. The route must be cleared, approved and decided by vehicle dispatch control center. Thus, the transportation system of this disclosure is different from cat-ski/heli-ski where the route is often unprepared, untraced and decided by the driver.

Way-Up/Way-Down

Once a ride on the way up is complete, the transportation system of this disclosure shall check if any ride on the way down is requested. If needed, the vehicle, completed its transportation going-up, is assigned to execute the transportation ride going-down. If not, the vehicle returns to its start location. A start location is a place where vehicles go while waiting for next transportation instruction. There can be many start locations in a ski resort, and they can vary according to the needs.

Figure 5:
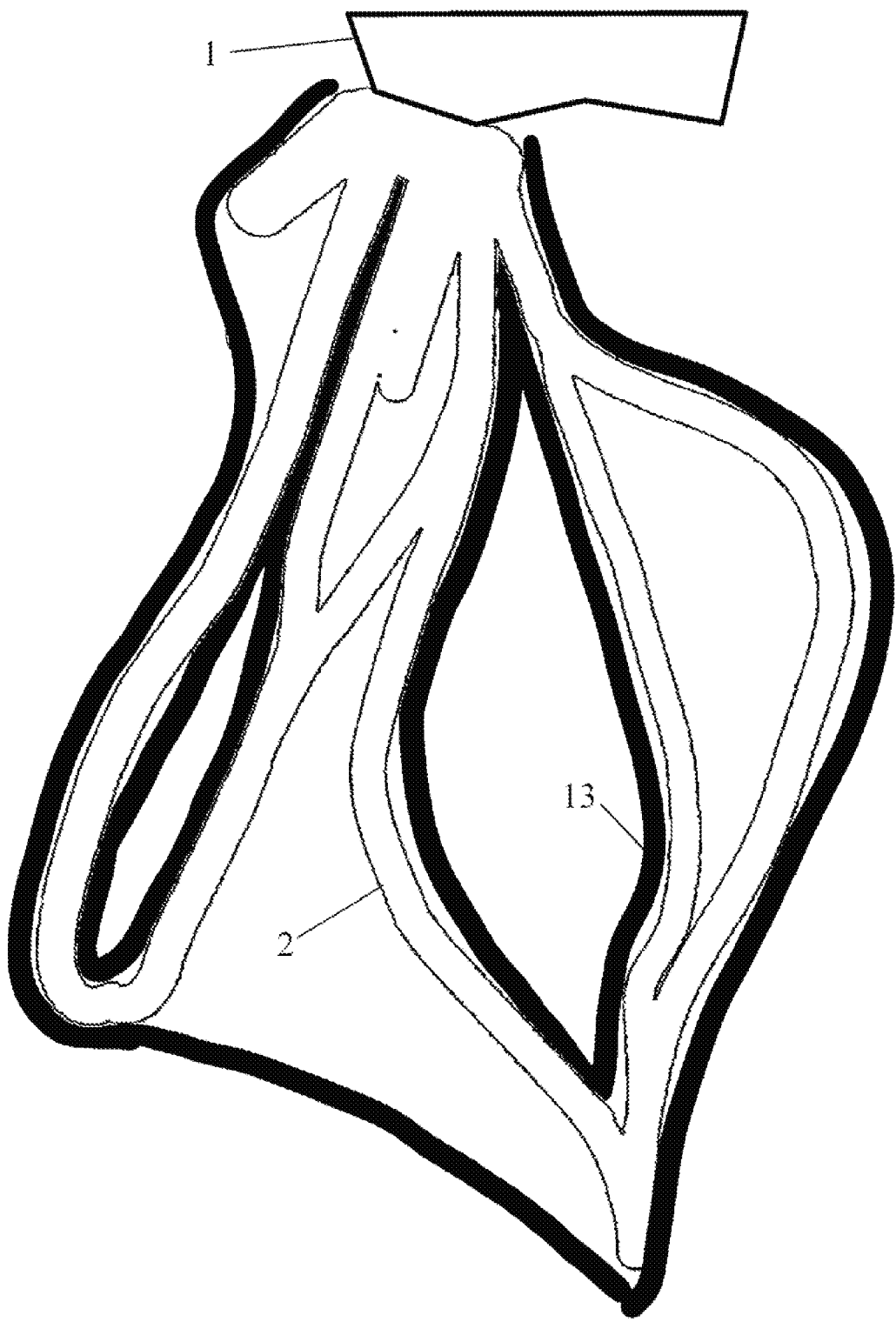
FIG. 5 is a sketch of the possible vehicle route in a fully open ski slope network in this disclosure
Figure 6:
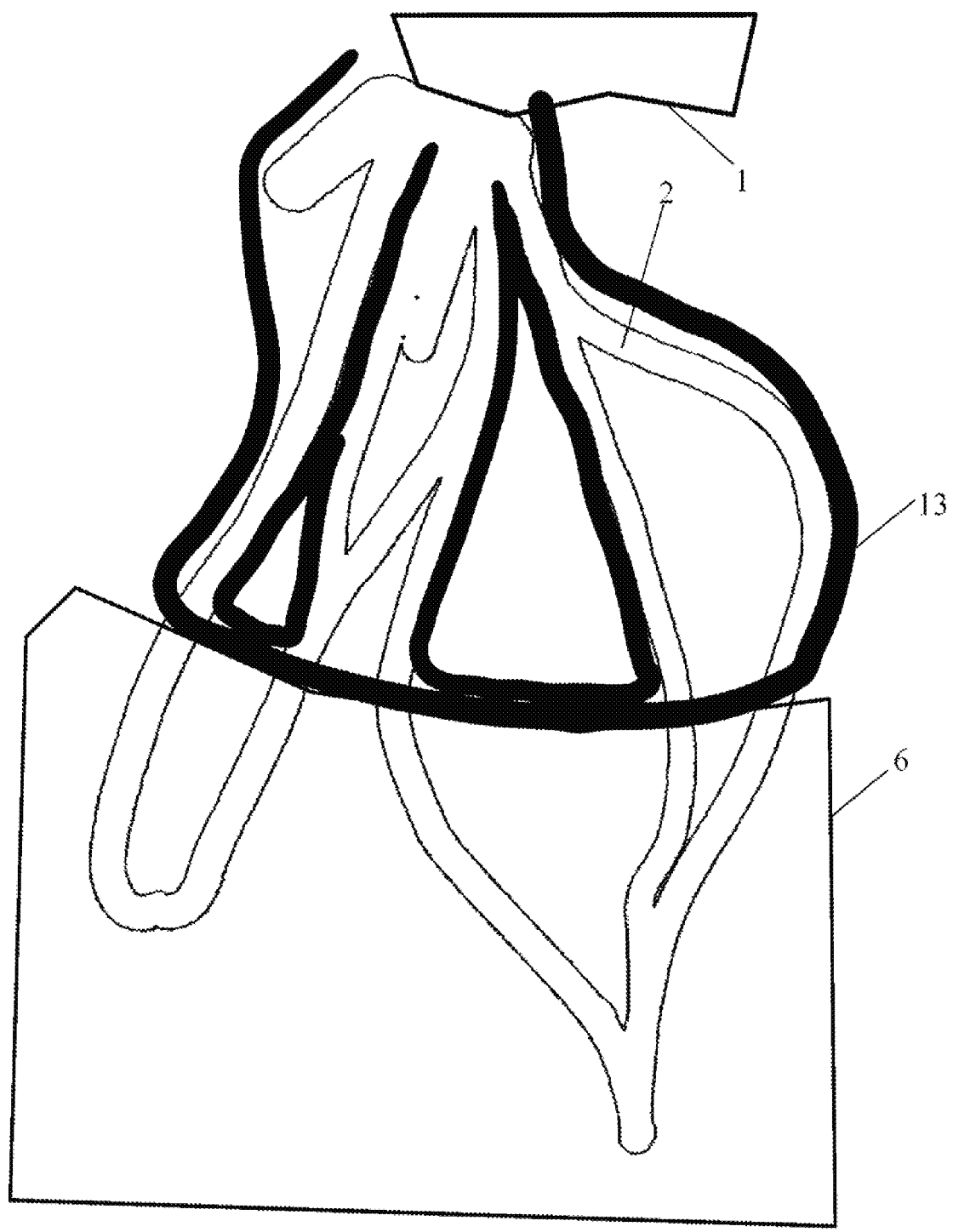
FIG. 6 is a sketch of the possible vehicle route in a ski slope network closed on the top in this disclosure
Figure 7:
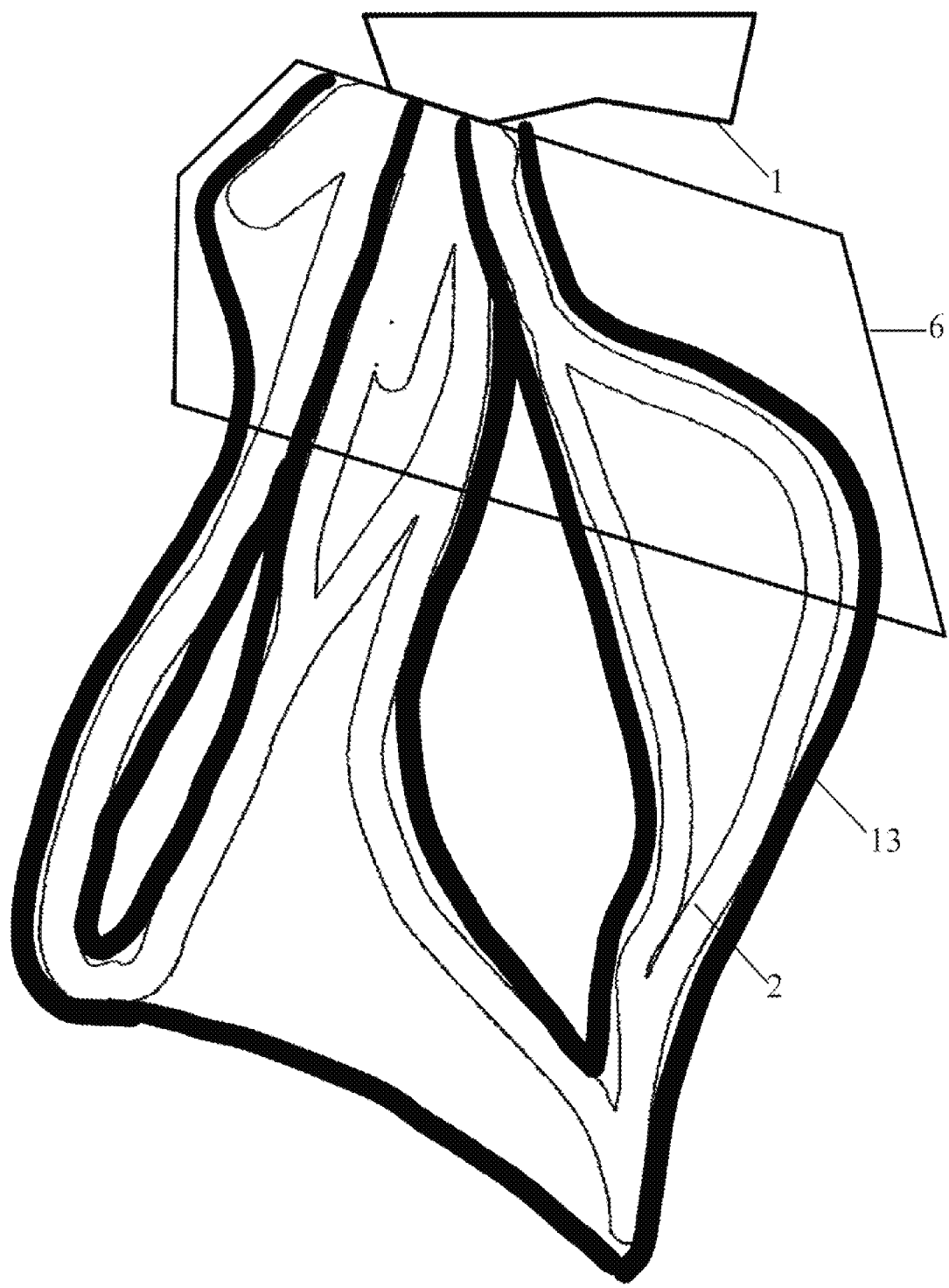
FIG. 7 is a sketch of the possible vehicle route in a ski slope network closed in the bottom in this disclosure

FIG. 5 is the possible vehicle route in a fully open ski slope network, in this disclosure, FIG. 6 is the possible vehicle route in a ski slope network closed on the top, in this disclosure, FIG. 7 is the possible vehicle route in a ski slope network closed in the bottom, in this disclosure.

See FIGS. 5 to 7, the transportation system in this disclosure can ensure connections with normally unreachable ski slopes. The transportation system is also able to bring skiers from and to a slope without extra cost, makes it possible to reach ski slopes previously unusable because of the high investment necessary.

The transportation system, in this disclosure, ensures the skiers' flow flexibility of a ski slope network/ski resort. The skiers' flow can be adjusted from one part of a ski resort to another without extra vehicles. A same vehicle can transport passengers anywhere in the resort.

The transportation system in this disclosure converts hotels and other infrastructures that are far away from slopes to ski in/out type. Skiers can directly access ski slopes from an infrastructure with a near pick-up location, and can return from ski slopes to the near drop-off location of the infrastructure.

The transportation system in this disclosure can connect separated ski slopes. Remote ski slopes, which are not able to be connected with standard ski-lifts, can be connected with this transportation system by joining the pick-up location of one slope to the drop-off location of the separated slope into a same ski slope network system, connections with remote ski fields can be realized.

A breakdown on one vehicle of the transportation system of this disclosure does not affect the overall transportation capacity of the system.

The transportation system in this disclosure enables to extend a ski slope network without extra investment/construction in skier transport. With this transportation system, given there is sufficient snow, a ski resort could extend its slope network without extra needs to develop transportation system. The existing system can be shared by as many slopes as needed.

The transportation system in this disclosure is able to adapt to a ski slope variable in length and supply pick-up and drop-off locations associated and intermediate stopping locations along the route, or to extend to temporary ski slope.

Figure 8:
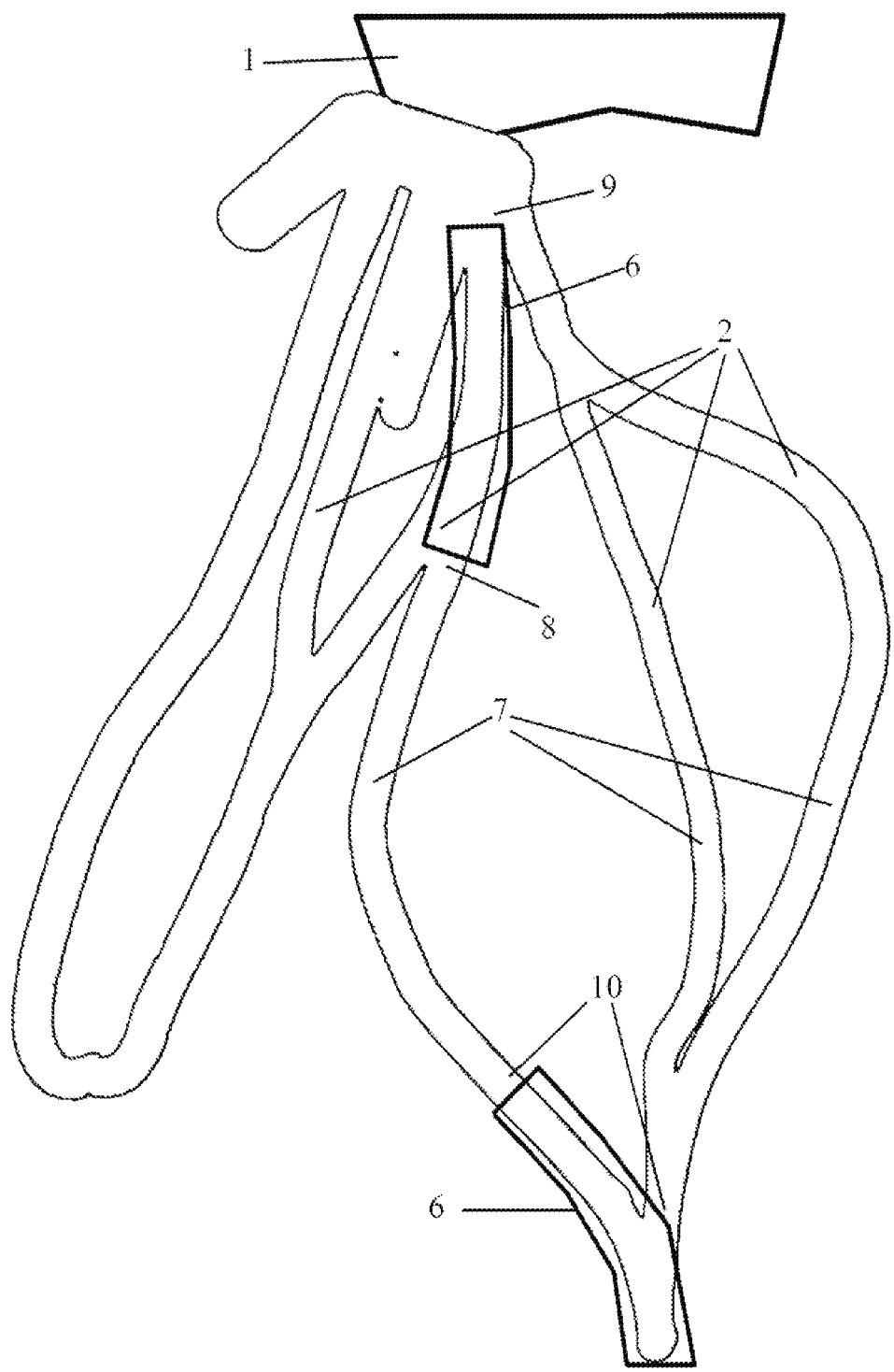
FIG. 8 is a sketch of ski resort operation in this disclosure.

FIG. 8 is a ski resort operation sketch diagram, in this disclosure, as shown in FIG. 8, ski resort includes village/day-lodge 1, Ski slopes 2, non-skiable zone 6, skiable zone 7, new pick-up location 8, pick-up location 9, new drop-off location 10, when the ski resort has 2 sections non-skiable as area 6, through setting up new pick-up location 8, the pick-up location 9, new drop-off location 10, and combined with vehicles, the ski resort can operate continuously on skiable zone 7. So, the man-made ski resort operation and management system and management method in this disclosure allow ski slopes variable in length, with the top and the bottom of the ski slope is non-skiable, to not close and to continue to accommodate skier. The middle section of the slope remains open with new pick-up 8 and drop-off locations 10 to allow skiing in this skiable zone 7. The village keeps its pick-up and drop-off locations to allow skiers to come and go from the village to all skiable zones.

Figure 9:
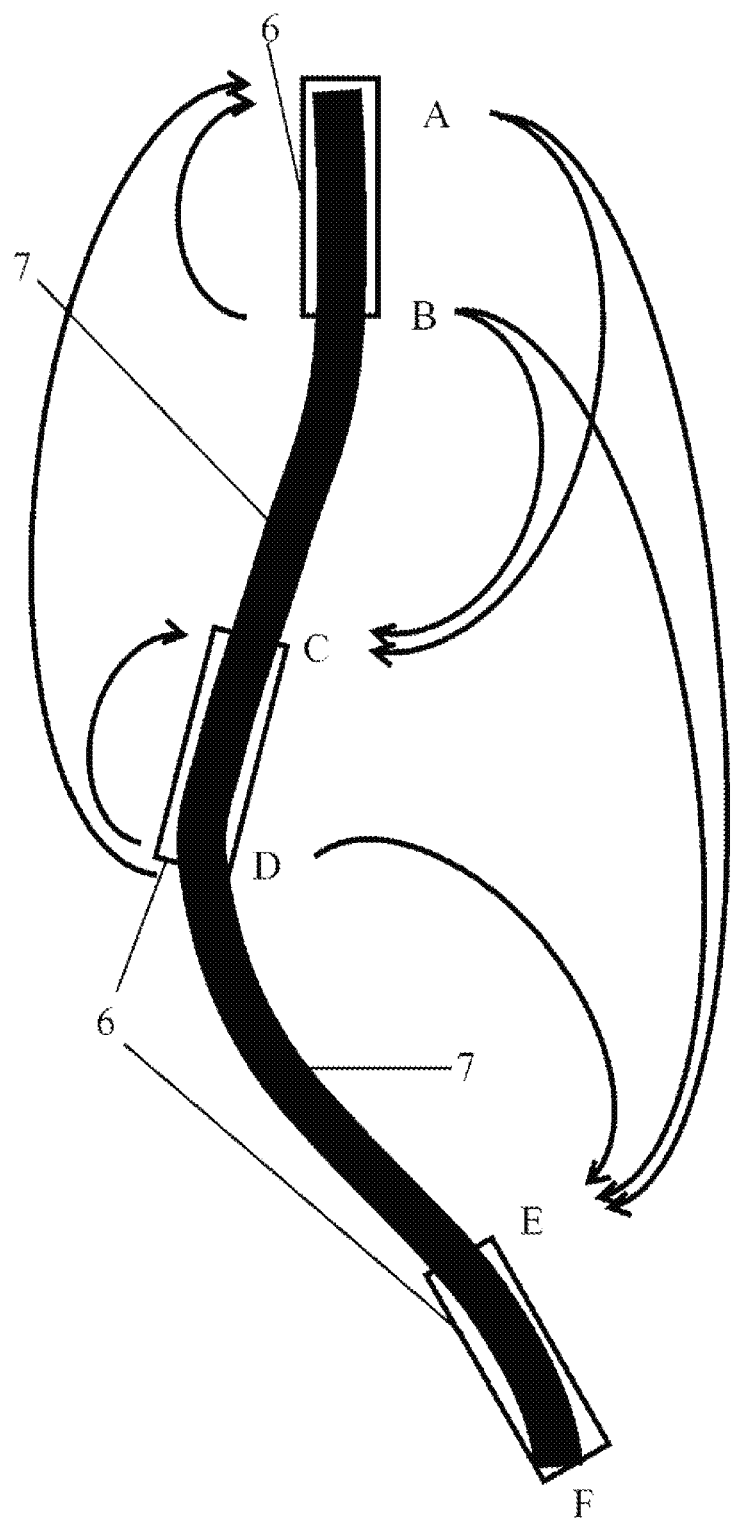
FIG. 9 is a sketch of the available transportation for skiers according to different case of non-skiable zone in this disclosure.

FIG. 9 is a sketch diagram of this disclosure dispatchable transportation system for skiers according to different case of non-skiable zone. When a ski slope have some non-skiable zone 6 and the skiable zone 7, the skier can be transported by vehicles from village A to new drop-off location C and E, from new pick-up location B to new drop-off location C E and village A, from new pick-up location D to new drop-off locations C, E and village A, from mountain top F to new drop-off location C, E and village A and etc.

Figure 10:
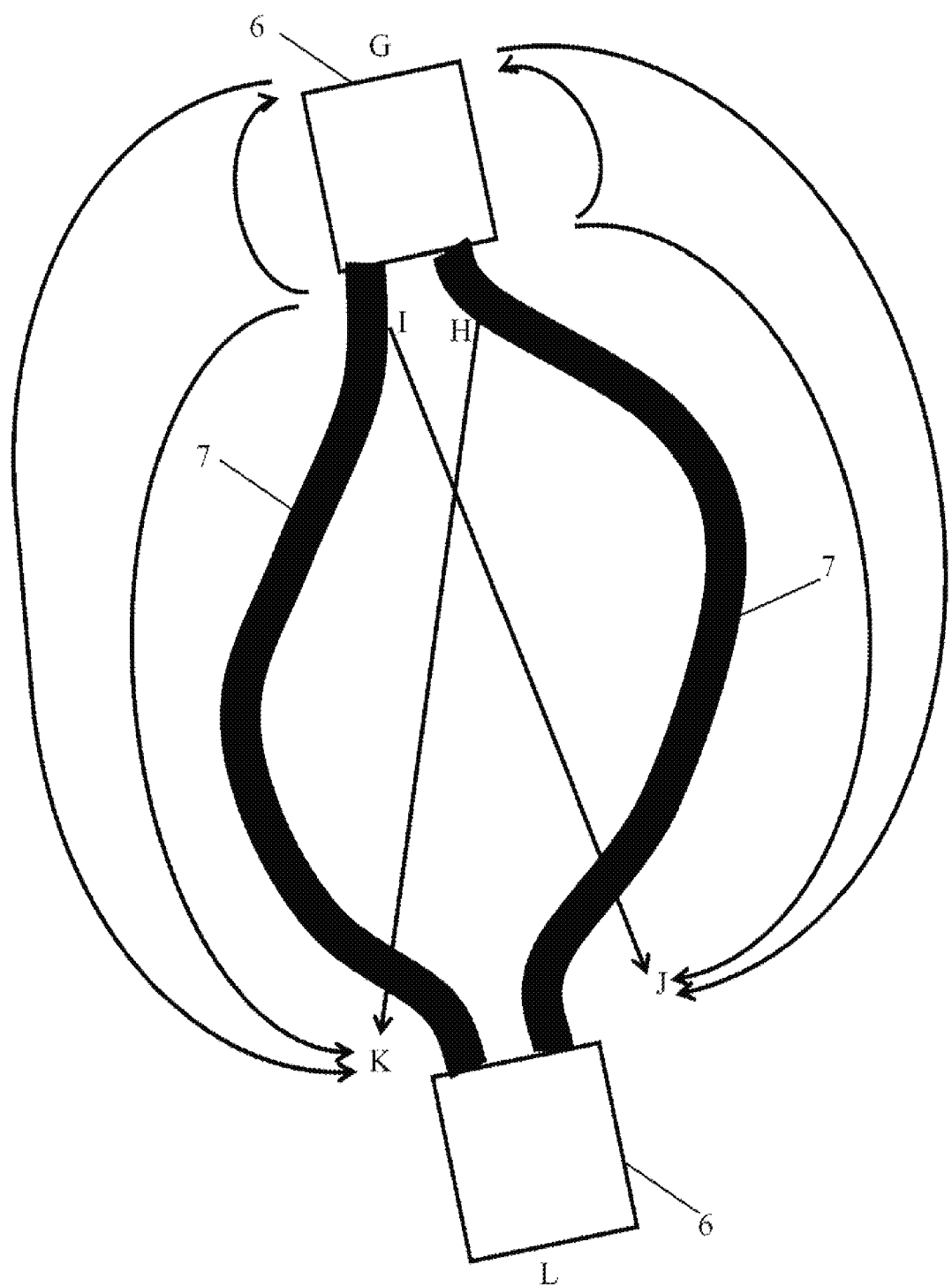
FIG. 10 is a sketch of the available transport connection of two ski slopes with separated skiable zones in this disclosure.

FIG. 10 is a sketch diagram of this dispatchable vehicle of this disclosure transport system between two ski slopes with separate skiable zones. As shown in FIG. 10, the dispatchable vehicle system can be used to have the two ski slopes with separated skiable zones connected. For example, skiers are transported from new pick-up location H to new drop-off location K, from new pick-up location I to new drop-off location J, also can use the dispatchable vehicle system to transport skiers from new pick-up location H, mountain top L and village/day-lodge G to new drop-off location K. and etc.

Figure 11A:
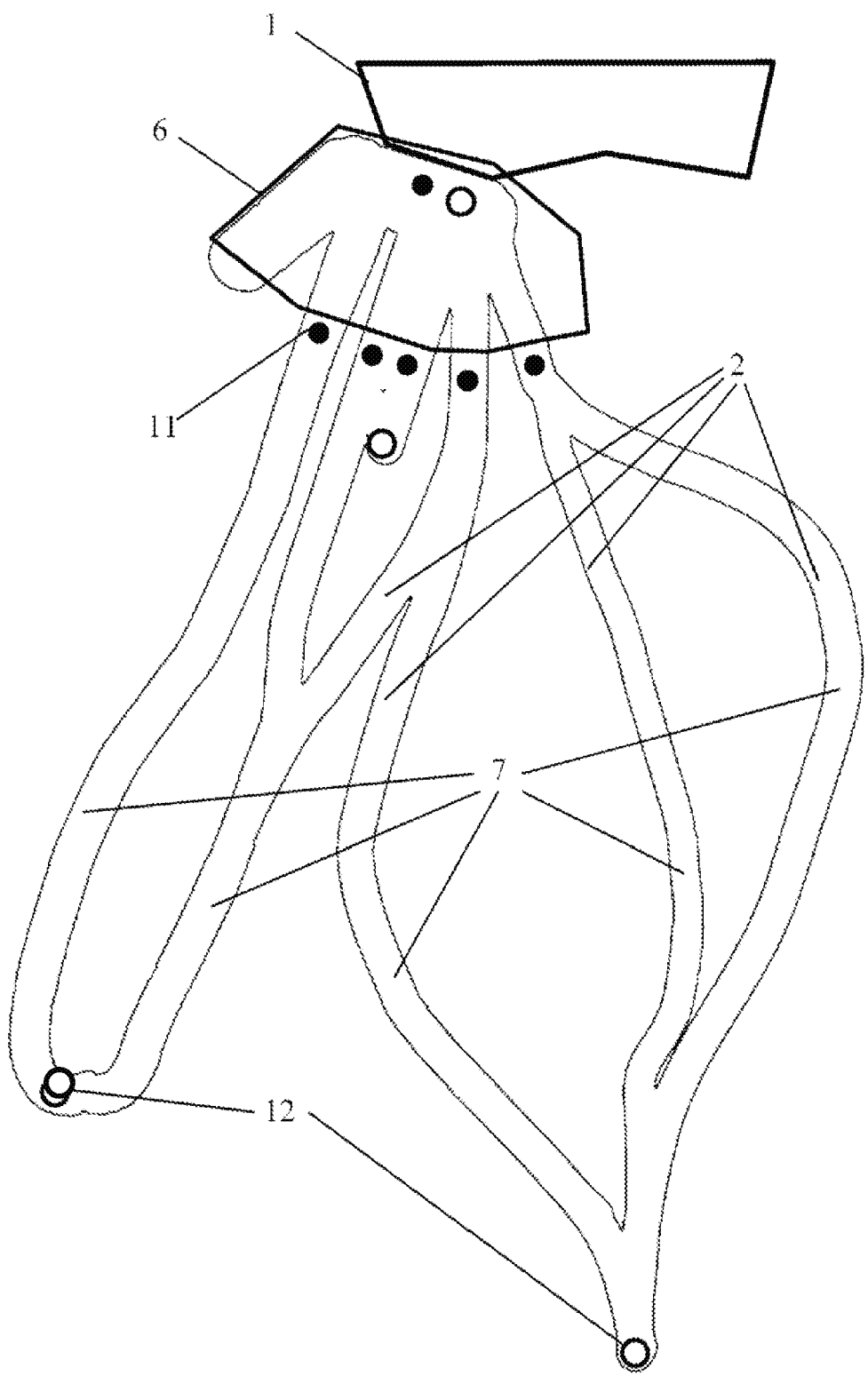
FIG. 11a is a sketch of new pick-up and drop-off locations when a ski resort which has the bottom of the resort closed.

FIG. 11*a* is a sketch diagram of the new pick-up and drop-off locations of this disclosure when the non-skiable zone 6 is at the bottom of the ski resort. As shown in the figure, when the non-skiable zone 6 is at village/day-lodge 1, by adding the new pick-up location 11 and keeping the same drop-off locations 12 in the skiable zone 7 in the middle of the ski resort, using various vehicles can ensure the most parts 7 of the slopes 2 remain in operation.

Figure 11B:
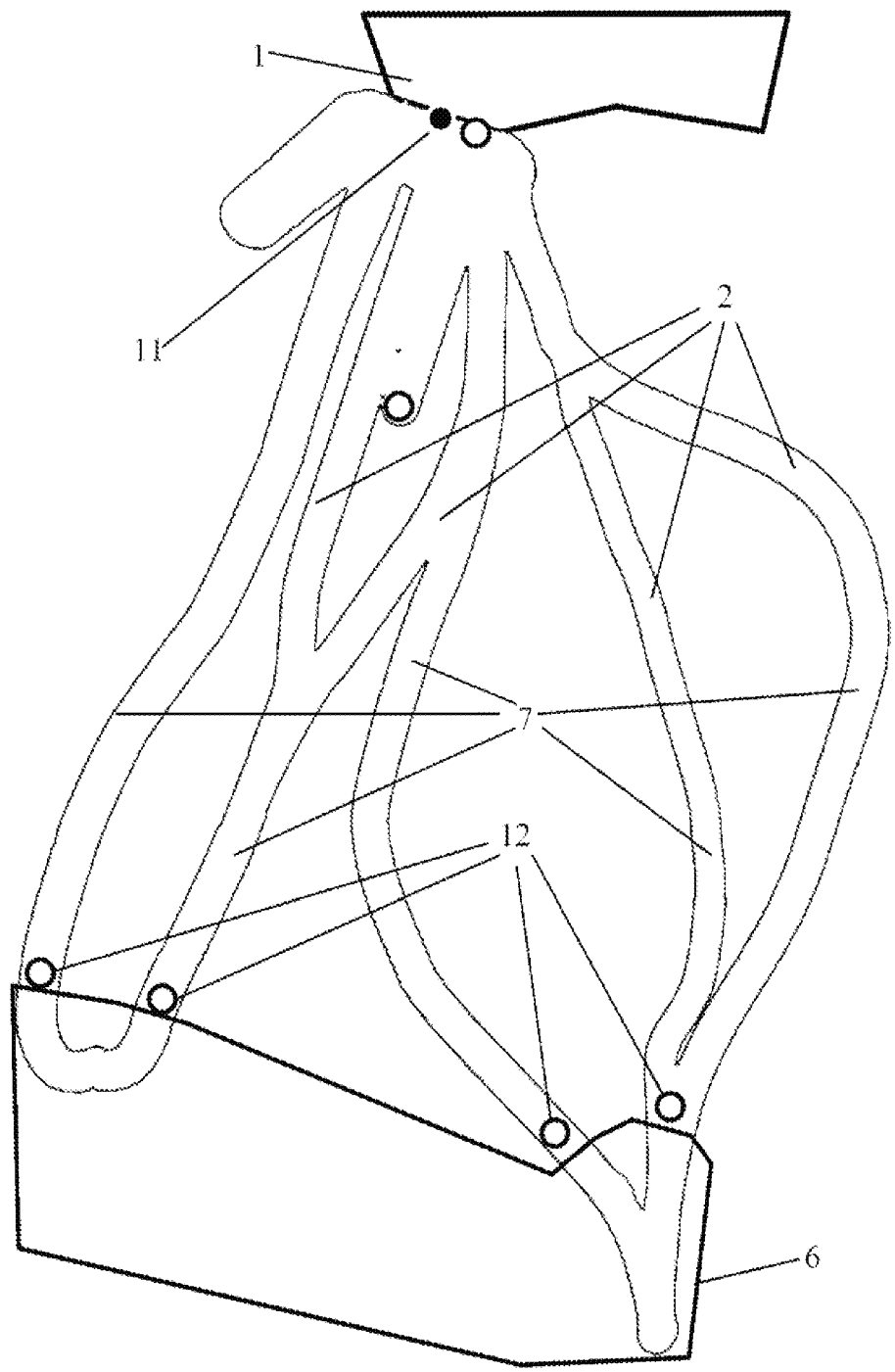
FIG. 11b is a sketch of new loading and drop-off locations when a ski resort which has the top of the resort closed.

FIG. 11*b* is a sketch diagram of the new pick-up and drop-off locations of this disclosure when the non-skiable zone 6 is at the top of the slope, as shown in the figure. When the non-skiable zone 6 is at mountain top, by keeping same pick-up location 11 and adding new drop-off locations 12, using various vehicles can ensure the most parts of the slopes 2 remain in operation.

Figure 12:
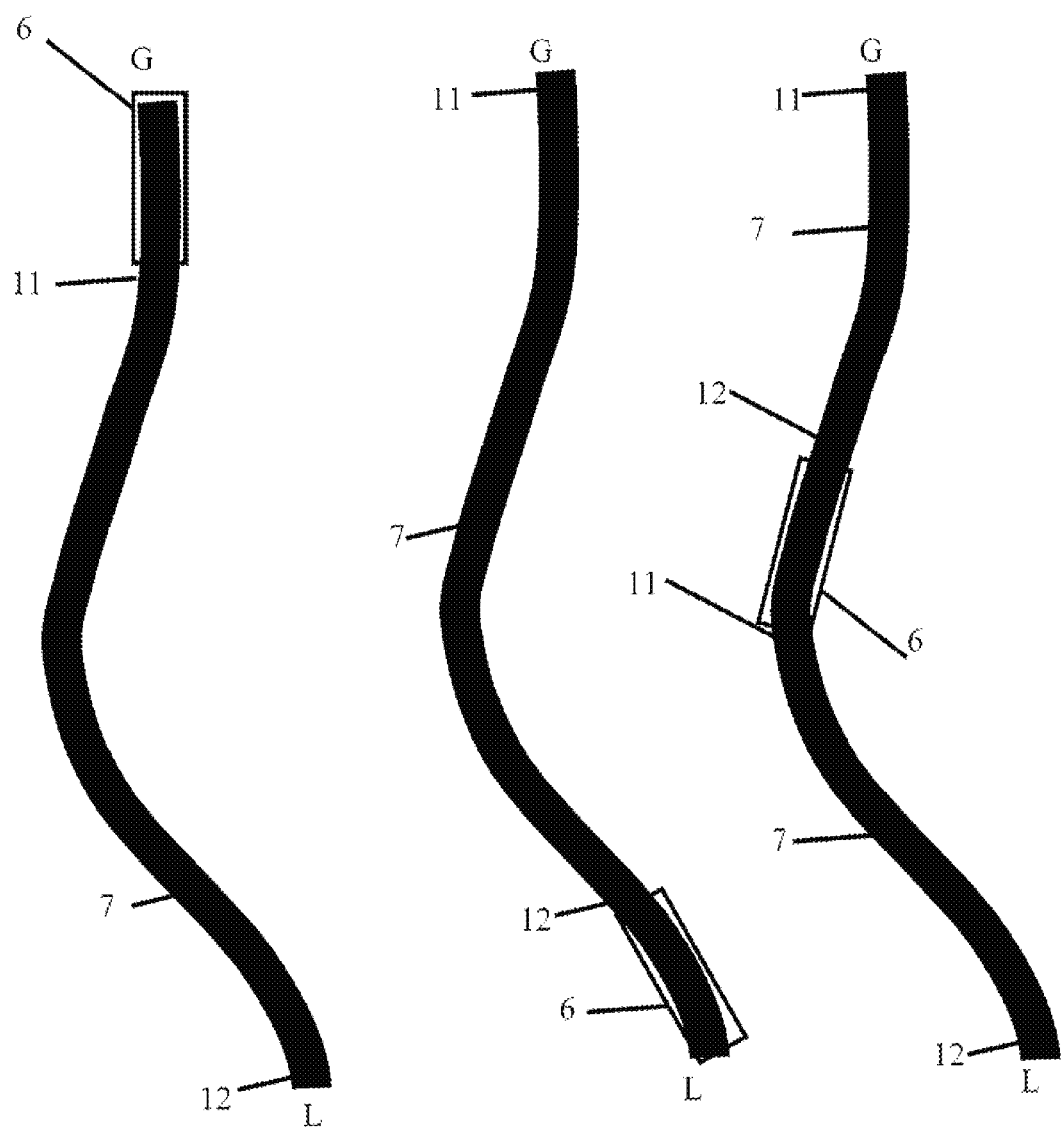
FIG. 12 is a sketch of different non-skiable zone in the ski slopes of this disclosure.

FIG. 12 is a sketch diagram of different case of non-skiable zones that may appeared on each ski slopes in the ski resort of this disclosure. No matter where the non-skiable zone is, at ski slope bottom, namely village/day-lodge G, at the ski slope top, i.e. the mountain top L, or in the middle of the ski slope, the skiable zone 7 can be continued to operate by adding a new pick-up location 11 and drop-off location 12, ski slopes partially opened in a ski resort can be any combination of these three cases.

To replace traditional lift, the vehicles in this disclosure have following advantages:

The man-made ski resort mass transportation system and transportation method, with various vehicles, can adjust the transportation capacity and the investment according to ski market demand at any time.

The vehicle has no problem for rescue at night in case of breakdown which is not the case of aerial ropeway. The system allows ski resorts to have a regular business at night, for example, the altitude restaurant or altitude hotel with no road access. The transportations are executed by plenty of independent vehicles going up or down.

The vehicles can be used to carry snow to any location from a snow pick up place to a place needed sow and there is no need to lay down pipelines along ski slopes. The vehicles can be used to carry snow during time that there is no need of carrying skiers, typically before the ski season start or during night in ski season. In such a way, the investment cost of snow making system may be reduced. In addition, most of the snowmaking system is then movable which will allow financing by leasing or with mortgage.

The vehicles will make it easy to resale as secondhand and to relocate the transportation system to another ski resort, and allow to financing by lease or mortgage.

The vehicles can be quickly delivered, even in winter delivery can be made to ski resorts, with simple installation. The dispatchable vehicle system only needs quality inspection in manufacturer's factory before leaving the factory, and there is no need labor cost and time-consuming annual strict inspection on site for lift.

The vehicles have the loading/unloading executed when the vehicle is stopped, it's safe for skiers. Most of the lifts are loading and unloading skiers on moving vehicle.

In this disclosure, break down of one individual vehicle among all vehicles nearly has no influence on the whole ski resort operation.

In this disclosure, when wind is too strong in some areas of a ski resort, vehicles can be moved to non-windy location for operation, then will increase the uphill hourly capacity in the non-windy area.

in this disclosure, as the investment of vehicles may be less than ¼ of an aerial lift of 5 km long, this allow to design profitable ski resort in mountain that cannot be profitable with conventional expensive aerial lift. This disclosure, allows to change the design of ski slope networks in master planning.

The vehicles will allow to give service at several ski-starting locations on same day, so as to group several non-profitable ski slopes into one profitable ski slope network, in such a way, it has changed the design of ski slope networks in master planning.

In this disclosure, the vehicles can, according to hourly transportation capacity change in one day, be moved easily from one area to another, which will lower investment and increase the IRR.

It should be stated in the end that: the implement samples above are only used to illustrate the technical scheme of this disclosure, not to limit it; although it describes this disclosure in detail with reference to the aforementioned samples, the common technicians in this field should understand: he/she still can modify the technical schemes as being described in the aforesaid sample, or replace some of the technical features equivalently; but these modifications or replacements will not make the essence of the corresponding technical scheme deviate from the spirit and scope of each sample technical scheme of this disclosure.

What is claimed is:

1. A man-made ski resort transportation system, comprising:
   a ski slope control center(s), receiving environmental parameters of each ski slope, judges if the environmental parameters of each ski slope in a man-made ski resort digital map are within a preset critical value, defines zones of ski slope in which the environmental parameters of each ski slope are not within the preset critical value, and sends a defined ski slopes network digital map to vehicle dispatch control center(s); and
   a vehicle dispatch control center, receiving the defined ski slopes network digital map, transportation zones environmental parameters and transportation needs, according to the man-made ski resort digital map and the transportation zones environmental parameters, calculates a transportation zone digital map, and according to the transportation zone digital map, the transportation zones environmental parameters and the transportation needs from users' terminals, works out routes and send them to each vehicle and users, wherein the vehicle dispatch control center sends an executive order to vehicles connected with the vehicle dispatch control center, each vehicle receiving the executive order sent by the vehicle dispatch control center and moving according to the executive order, and wherein the transportation zones environmental parameters includes: a snow thickness on the transportation zones, slippery conditions on snow or on earth in the transportation zones, a snow density in the transportation zones, weather of the transportation zones, aerial condition of the transportation zones, and/or obstacles on the transportation zones.

2. The man-made ski resort transportation system according to claim 1, wherein each vehicle sends a vehicle operation information to the vehicle dispatch control center in real time, the vehicle operation information includes: vehicle location, vehicle speed, ground condition, aerial condition, fuel condition, battery condition, and/or fault state of vehicle.

3. The man-made ski resort transportation system according to claim 2, wherein the man-made ski resort digital map also includes: a transportation zone route condition and a vehicle location information.

4. The man-made ski resort transportation system according to claim 3, wherein each vehicle in the dispatchable vehicle system includes a vehicle drive unit and a vehicle cabin, and each vehicle determines the type of the vehicle cabin according to an object to be transported.

5. The man-made ski resort transportation system according to claim 4, wherein the vehicle dispatch control center also receiving the transportation needs from a ski slope dispatch control center, according to a booking number data predetermined by various ski resort accommodations and locations, the vehicle dispatch control center calculates vehicles needed in number at each accommodation building and according to the vehicle needs at each accommodation building, the vehicle dispatch control center dispatches the vehicles.

6. The man-made ski resort transportation system according to claim 5, wherein the vehicle dispatch control center also identifying the images of skiers or animal outside of the groomed ski slope/s, which are captured by cameras monitoring the transportation zones, when skier/s or an animal appeared on the preset route/s, the vehicle dispatch control center edits the signal of changing route or stopping and sends them to the vehicles.

7. The man-made ski resort transportation system according to claim 5, wherein the vehicle dispatch control center also identifying images collected by cameras that are monitoring the ski resort transportation zone, and to identify obstacles outside ski slope/s or moving objects in the transportation zones, and the vehicle dispatch control center edits the signal of changing route or stopping and sends them to the vehicles.

8. The man-made ski resort transportation system according to claim 5, wherein the vehicles also identifying the transportation zones' images collected by cameras or sensor/s installed on the vehicles, and to identify obstacle/s in the transportation zone, and the vehicles edits the identified transportation zones' images and the identified obstacle/s and sends the identified transportation zones' images and the identified obstacle/s to the vehicle dispatch control center.

9. The man-made ski resort transportation system according to claim 4, wherein the vehicle dispatch control center also receiving the transportation need given by a ski slope dispatch control center and resolving the transportation need into information of transportation route and the object to be transported, give the transportation order to vehicles which are close to transportation location and suitable for the object to be transported according to the information of transportation location and object to be transported.

10. The man-made ski resort transportation system according to claim 1, wherein the transportation zones environmental parameters are sent through a manual input or an automatic sensor or an external data base.

11. A transportation method for a man-made ski resort transportation system, comprising the following steps:

receive environmental parameters of each ski slope, judge if the environmental parameters of each ski slope in a man-made ski resort digital map are within a preset ski slope environmental parameters critical value, when the environmental parameters of each ski slope are not within the preset ski slope environmental parameters critical value, define a route section and send a defined man-made ski resort digital map to vehicle dispatch control centers; and receive the man-made ski resort digital maps, transportation zones environmental parameters and transportation needs, calculate a transportation zone digital map and then according to transportation zone digital map and the transportation zones environmental parameters and the transportation needs from users' terminal/s calculate a route and send the route to various vehicles and users, wherein the vehicle dispatch control center sends an executive order to vehicles connected with the vehicle dispatch control center, each vehicle receives the executive order sent by the vehicle dispatch control center and move according to the executive order, and wherein the transportation zones environmental parameters comprising a snow thickness on the transportation zones, ground condition, aerial condition, slippery conditions on snow or on earth in the transportation zones, weather conditions, obstacles, and/or a risk of avalanche in the transportation zones.

12. The transportation method according to claim 11, wherein each vehicle includes a drive unit and a vehicle cabin, and each vehicle determines the type of the vehicle cabin according to an object to be transported.

13. The transportation method according to claim 11, wherein the vehicle dispatch control center receives the data of transportation needs from a ski slope dispatch control center and a booking number data, and calculates the vehicle needed at each accommodation, then dispatches the vehicles according to the numbers needed at each accommodation.

14. The transportation method according to claim 13, wherein the vehicle dispatch control center identifies images of skiers or animal outside groomed slopes which are captured by cameras installed monitoring the transportation zones, when skier/s or animal appeared in the transportation zones, the vehicle dispatch control center edits a signal of changing route or stopping and sends the signal of changing route or stopping to the vehicles.

15. The transportation method according to claim 13, wherein the vehicle dispatch control center identifies images collected by cameras monitoring the transportation zone, and identifies obstacles or moving object or avalanche on transportation zones, and edits a signal of changing route or stopping, and sends the signal of changing route or stopping to the vehicles, then sends safety warning and alerts a security and rescue center;

the vehicle dispatch control center uses artificial intelligence to learn how to select the best route according to the past experience and the today data.

16. The transportation method according to claim 11, wherein the vehicle dispatch control center receives the transportation needs given by a ski slope dispatch control center and resolves the transportation location request into information of transportation route and the object to be transported, gives the transportation order to vehicles which are close to transportation location and suitable for the object to be transported according to the information of transportation location and the object to be transported.

17. The transportation method according to claim 11, wherein the transportation zones environmental parameters are sent through a manual input or automatic sensors or external data base.

18. The transportation method according to claim 11, wherein each vehicle sends to the vehicle dispatch control center a vehicle operation condition at real time; the vehicle operation condition includes: vehicle location, vehicle speed, ground condition, aerial condition, battery condition, and/or fault state of vehicle.

* * * * *